United States Patent [19]

Kuhl

[11] Patent Number: 4,704,755
[45] Date of Patent: Nov. 10, 1987

[54] APPARATUS FOR CLEANING EGGS

[76] Inventor: Jeffrey B. Kuhl, Kuhl Rd., P.O. Box 26, Flemington, N.J. 08822

[21] Appl. No.: 847,996

[22] Filed: Apr. 3, 1986

[51] Int. Cl.⁴ .......................................... A01K 43/00
[52] U.S. Cl. .................................................... 15/3.13
[58] Field of Search ............................. 15/3.11–3.18, 15/77, 102; 134/6

[56] References Cited

U.S. PATENT DOCUMENTS

| | | |
|---|---|---|
| 1,074,940 | 10/1913 | Freer . |
| 1,113,190 | 10/1914 | Brandt . |
| 1,205,117 | 11/1916 | Stamm . |
| 1,423,059 | 7/1922 | Williamson . |
| 1,542,347 | 6/1925 | McCullough . |
| 1,723,441 | 8/1929 | Richards . |
| 1,777,039 | 9/1930 | Hatch . |
| 1,780,924 | 11/1930 | Ingraham . |
| 1,955,749 | 4/1934 | Jones . |
| 1,964,275 | 6/1934 | Secondo . |
| 2,035,587 | 3/1936 | Brandenburg . |
| 2,179,474 | 11/1939 | Stebler . |
| 2,183,033 | 12/1939 | Segrin . |
| 2,199,831 | 5/1940 | Cunning . |
| 2,301,931 | 11/1942 | Davis . |
| 2,371,867 | 3/1945 | Bayles . |
| 2,412,565 | 12/1946 | Davis . |
| 2,442,475 | 6/1948 | Swanson . |
| 2,538,331 | 1/1951 | Ruzsicska . |
| 2,587,730 | 3/1952 | Hutchinson et al. . |
| 2,588,787 | 3/1952 | Wright . |
| 2,632,901 | 3/1953 | Markusen et al. . |
| 2,640,209 | 6/1953 | Johnson . |
| 2,673,361 | 3/1954 | McCutchan . |
| 2,979,746 | 4/1961 | Willsey . |
| 3,049,135 | 8/1962 | Kuhl et al. . |
| 3,099,848 | 8/1963 | Mountz . |
| 3,203,435 | 8/1965 | Kurtz . |
| 3,252,607 | 5/1966 | Rose et al. . |
| 3,349,419 | 10/1967 | Kuhl et al. . |
| 3,360,817 | 1/1968 | Halverson . |
| 3,392,414 | 7/1968 | Cathcart . |
| 3,909,290 | 9/1975 | Peppler et al. . |
| 4,276,977 | 7/1981 | van Kattenbroek . |
| 4,353,455 | 10/1982 | Mumma et al. . |
| 4,358,341 | 11/1982 | Berquist . |
| 4,499,623 | 2/1985 | Kuhl . |

FOREIGN PATENT DOCUMENTS

| | | |
|---|---|---|
| 758340 | 1/1931 | France . |
| 552170 | 11/1957 | Italy . |
| 164729 | 9/1980 | Netherlands . |
| 1037574 | 7/1966 | United Kingdom . |
| 258761 | 4/1970 | U.S.S.R. . |

Primary Examiner—Edward L. Roberts
Attorney, Agent, or Firm—Sperry, Zoda & Kane

[57] ABSTRACT

An apparatus for cleaning eggs having multiple cylindrical brushes rotatably mounted upon rods and extending laterally across a conveyor which carries eggs thereon. At least one flat brush is positioned between each adjacent cylindrical brush to achieve washing of the eggs in the dead space where no washing would normally occur between cylindrical brushes. In a preferred configuration, a plurality of such flat brushes are cyclically movable longitudinally with respect to the direction of movement of the conveyor, whereas the cylindrical brushes are free for rotational movement thereof and are driven laterally across the egg conveyor. With this combined brushing action, three complete directions of brushing movement are experienced by the outer surfaces of the eggs to be washed alternately through as many as seven or eight cycles of the various brushing actions. In a preferred configuration, eight cylindrical brushes are separated from one another by seven groupings of flat brushes.

14 Claims, 3 Drawing Figures

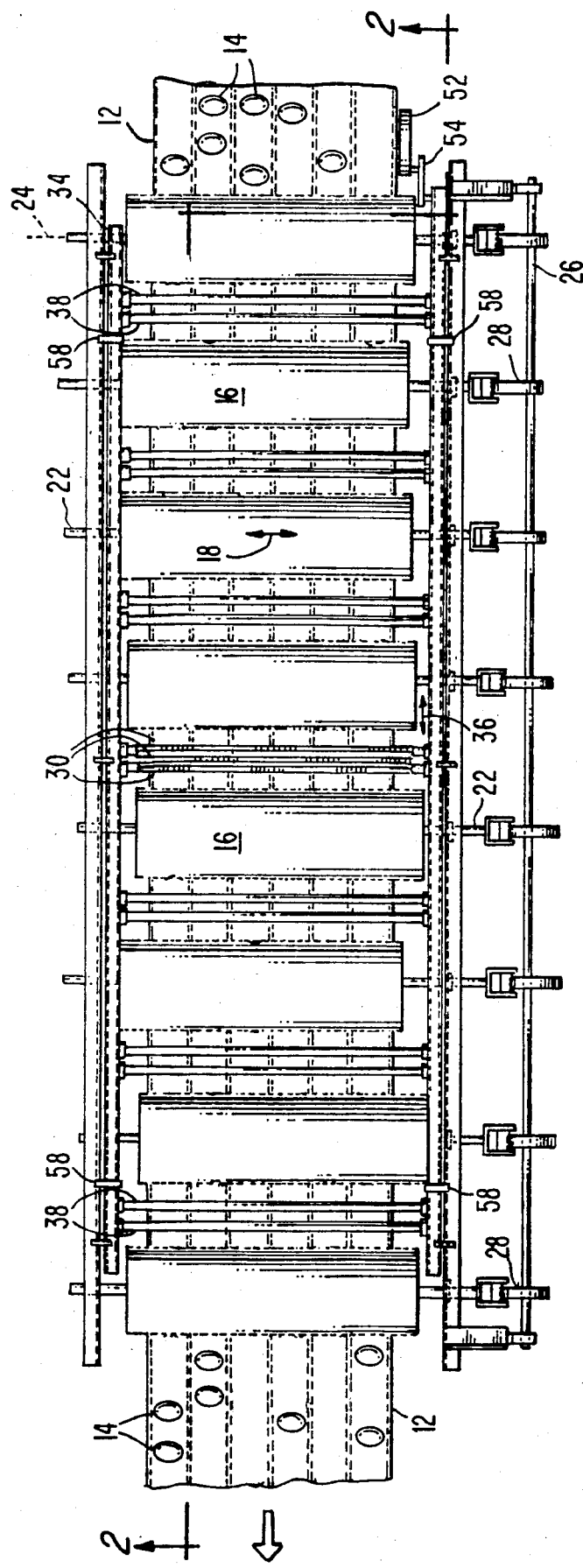
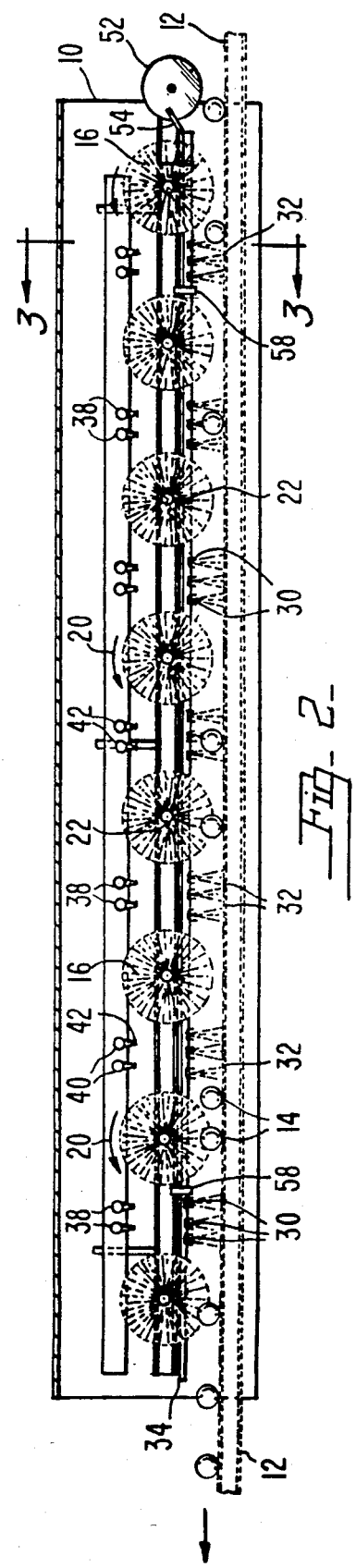

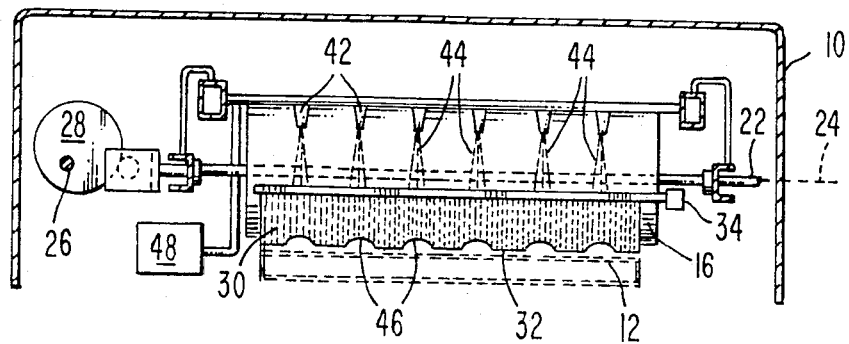

APPARATUS FOR CLEANING EGGS

BACKGROUND OF THE INVENTION

1. Field of the Invention

Prior art configurations have utilized various types of cylindrical brushes for achieving effective scrubbing action of the outer surface of eggs as they are carried upon conveying means. Other washing means utilize flat brushes for achieving scrubbing of the eggs. Other washing means include merely a plurality of nozzles exerting downwardly directed cleaning solution under high pressure for basically knocking off debris and other contaminates from the outer surfaces of eggs.

2. Description of the Prior Art

Examples of such patent configuration include U.S. Pat. No. 4,499,623 which discloses an Egg Cleaning Apparatus utilizing cylindrical brushes which are positioned adjacent to one another with no cleaning means therebetween.

Another example is shown in U.S. Pat. No. 3,349,419 on Egg Washing Equipment patented Oct. 31, 1967 which utilizes flat brush means to achieve external cleaning of eggs. The present invention provides a novel means of alternative brushing with three basic different types of actions which are alternatively experienced by the external surface of the egg to achieve the novel brushing disclosed herein.

SUMMARY OF THE INVENTION

An apparatus for cleaning eggs is disclosed which includes a housing having a conveyor movable longitudinally with respect thereto and adapted to carry eggs thereon. A plurality of cylindrical brushes are positioned to extend laterally across the conveyor and are positioned immediately thereabove with the lowermost portions of the bristles thereof in contact with eggs being carried upon the conveyor. These cylindrical brushes are movably mounted to allow lateral movement thereof across the conveyor means as well as rotational movement thereof about the cylindrical axis. The rotational movement is a free degree of movement whereas the lateral movement is a driven movement.

A plurality of rods are positioned extending through the central axis of each of the cylindrical brushes such as the cylindrical brushes have rotational freedom of movement when mounted upon the rod means. A camshaft is rotatably mounted longitudinally with respect to the housing means and includes a plurality of cam lobes with one of each being adjacent to each end of the rods for reciprocally driving the rods and thereby achieving the cyclical lateral movement of the cylindrical brushes with respect to the housing and with respect to the conveyor itself.

A plurality of flat brush means are included with at least one thereof between each pair of cylindrical brushes. These flat brush means are positioned parallel with respect to the cylindrical brushing means and therefore are perpendicular with respect to the direction of movement of the conveyor. The flat brushing means include a lower edge thereof and positioned immediately above the conveyor to contact the eggs traveling upon the conveying means therebelow for further washing thereof. This lower edge may preferably include arcuate sections which are aligned with respect to each row of eggs passing thereunder to achieve more uniformity in brushing action upon the surface of the relatively round eggs.

A control rod may be positioned extending longitudinally along the conveying means adjacent to the housing means and is secured with respect to each of the flat brushing means in such a manner that when the control rod is reciprocally moved longitudinally with respect to the housing, it will cause a similar cyclical longitudinal movement of the flat brush means with respect to the eggs traveling upon the conveyor. This will receive flat scrubbing action between each cylindrical brushing action.

A plurality of fluid conduits are positioned extending above the conveyor means. These fluid conduits define spray outlets therealong which may include spray nozzles therein to direct cleaning solution downwardly from the fluid conduits onto the flat brush means and eggs located therebelow. In an alternative configuration, the spray nozzles can be configured to include a wide enough pattern to also provide wetting of the bristles of the adjacent cylindrical brushes to further achieve controlled washing of the eggs carried upon the conveyor.

Preferably the overall configuration includes eight cylindrical brushes with seven groupings of three each of the flat brushes between each adjacent pair of cylindrical brushes. Also preferably there will be two fluid conduits positioned immediately above the flat brushes for wetting thereof with a cleaning solution.

A pump means may also preferably be included to supply the cleaning solution to the fluid conduit at approximately 850 gallons per minute at a pressure of 20 pounds per square inch.

It is an object of the present invention to provide an apparatus for cleaning eggs which is relatively easy to maintain.

It is an object of the present invention to provide an apparatus for cleaning eggs wherein the capital cost of initial set up is relatively inexpensive.

It is an object of the present invention to provide an apparatus for cleaning eggs wherein breakage of eggs being washed therein is minimized.

It is an object of the present invention to provide an apparatus for cleaning eggs wherein the efficiency of the washing action is greatly enhanced.

It is an object of the present invention to provide an apparatus for cleaning eggs wherein a plurality of cylindrical brushes are utilized each being separated by at least one flat brush means.

It is an object of the present invention to provide an apparatus for cleaning eggs wherein a plurality of cylindrical brushes are allowed free rotational movement while including a driven lateral movement with respect to eggs being conveyed therebelow.

It is an object of the present invention to provide an apparatus for cleaning eggs wherein flat brush means are included between each adjacent cylindrical brushing means and the flat brush means are driven longitudinally with respect to the direction of movement of the conveyor therebelow.

It is an object of the present invention to provide an apparatus for cleaning eggs wherein sufficient pumping is utilized to supply cleaning solution to the dispensing conduits at 850 gallons per minute at a pressure of 20 pounds per square inch.

It is an object of the present invention to provide an apparatus for cleaning eggs wherein arcuate sections are included on the lower edges of the flat brushes to more evenly contact the outer surface of the egg to increase the efficiency of the washing operation.

It is an object of the present invention to provide an apparatus for cleaning eggs wherein three individual flat brush means are included between each adjacent cylindrical brushing means of a total of eight such cylindrical brushes.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a top plan view of an embodiment of the apparatus for cleaning eggs of the present invention;

FIG. 2 is a side cross sectional view of the embodiment shown in FIG. 1 along lines 2—2; and FIG. 3 is a cross sectional view of the embodiment shown in FIG. 2 along lines 3—3.

DETAILED DESCRIPTION OF THE PREFERRED EMBODIMENT

The present inventions provides an apparatus for cleaning eggs which includes a housing means 10 defined extending over a conveying means 12 which is designed to carry a plurality of eggs 14 thereon.

A plurality of cylindrical brushes 16 are positioned along the path of travel of the conveying means 12 at spaced positions with respect to one another. Each of the cylindrical brushes 16 extend laterally across the conveying means such as to be positioned immediately above the entire lateral width of conveying means 12.

Cylindrical brushes 16 are mounted upon rod means 22 each of which extends laterally across the path of movement of conveying means 12. The cylindrical brushes are freely rotatable upon rod means 22 to allow rotation thereof as desired for cleaning of eggs traveling thereunder. This rotational movement capability is shown by arrow 20.

Cylindrical brushes 22 are also mounted to be laterally movable as shown by lateral movement arrow 18. This lateral movement capacity provides a cross wise brushing action upon the surfaces of the eggs 14 traveling upon conveyor means 12 to provide a manner of cleaning different from that achieved by rotation of cylindrical brushes 16 as along arrow 20.

Each of the rod means 22 extends along the central axis 24 of the cylindrical brushes 16. The end of the rod means 22 extends through housing means 10 to a position adjacent to a camshaft means 26. Camshaft means 26 is preferably mounted longitudinally with respect to conveying means 12 and is mounted for rotational movement thereof. Camshaft means 26 includes a plurality of cam lobes 28 thereon each of said cam lobes located adjacent to one of the ends of said rod means 22. As the camshaft means 26 rotates, cam lobes which are eccentric, rotate causing movement of rod means 22 laterally with respect to the direction of movement of conveying means 12 and similar lateral movement of cylindrical brushes 16 as described above to be desired.

A plurality of flat brush means 30 are positioned at locations between adjacent cylindrical brushes 16. These flat brush means 30 present downwardly facing lower edges 32 which may include arcuate sections 46 thereon. Preferably the arcuate sections 46 will be oriented immediately above each row of eggs 14 in such a manner as to contact the entire outer shell thereof with equal brushing action. The degree of arc of section 46 will be approximately equal to the average arcuate shape of an outer egg surface.

A control rod 34 will extend longitudinally along at least one side of conveyor means 12 and will be fixedly secured with respect to each of the flat brush means 30. This control rod will be movable longitudinally with respect to the conveying means 12 to thereby move the flat brush means 30 longitudinally as shown by arrow 36 with respect to eggs 14 traveling upon conveyor 12. The control rod 34 may be longitudinally movable with respect to the conveyor means 12 by any standard powering configuration such as rotatable wheel 52 interconnected through link arm 54 to the control rod 34. Preferably link arm 54 will be pivotally secured with respect to the outer portion of wheel 52 and also will be pivotally secured at the opposite end with respect to the control rod 34. In this manner, rotation of wheel 52 will cause the link arm 54 to function like a connecting rod to translate the rotational movement of wheel 52 into reciprocating longitudinal movement of rod 34. Bearings 58 extend about control rod 34 to be slidably engaged therewith. The fixedly secured bearings 58 provide support through which rods 34 extend to allow pivotal movement thereof.

The combination of a cylindrical brush which is rotatable and laterally movable and with alternately spaced flat brushes 30 which are longitudinally movable achieves a three way brushing action alternatively experienced by the external surface of the eggs 14 which has been found to be extremely useful in dislodging virtually all debris or other contaminents on the external surface of the eggshell. In the preferred configuration, eight such cylindrical brushes 16 will be positioned along the path of movement of eggs 14 upon conveyor 12 with three flat brush sections 30 positioned in each of seven groupings between each pair of adjacent cylindrical brushes of the eight thereof. As such, eggs 14 travel upon conveyor means 12 will experience the double brushing action of cylindrical brushes 16, namely lateral and rotational brushes alternately eight times. In between each of the eight individual brushing actions, the eggs 14 will experience longitudinal brushing by flat brush means 30. The alternation of these brushing actions repeatedly from one type to another is extremely effective in cleaning of eggs.

To provide cleaning solution 44 for cleaning eggs 14, a plurality of fluid conduits 38 extend laterally across the conveying means 12 immediately above the approximate location of flat brush means 30. The fluid conduits 38 define spray outlets 40 therein which may include spray nozzles 42 therein to accurately receive cleaning solution 44 from pump means 48 for dispensing thereof downwardly onto the flat brush means 30. In some alternative configurations the spray outlets 40 will achieve a wide dispersal of the cleaning solution 44 in such a manner as to also wet adjacent cylindrical brushes 16 rather than merely the flat brushes 30 which are located immediately below the fluid conduits 38. Also preferably the cleaning solution is supplied at approximately 850 gallons per minute at a pressure of 20 pounds per square inch to the fluid conduits 38 to thereby provide a significant spray of cleaning solution 44 downwardly to increase the efficiency of overall washing.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for cleaning eggs which comprises:
   (a) a housing means;
   (b) a conveying means movable longitudinally with respect to said housing means and adapted to transport eggs positioned thereon;
   (c) a plurality of cylindrical brushes extending laterally across said conveying means and positioned immediately thereabove with the lowermost portions thereof in contact with eggs being carried upon said conveying means, said cylindrical brushes being movably mounted to allow lateral movement thereof across said conveying means as well as rotational movement thereof about the cylindrical axes thereof;
   (d) a plurality of rod means each extending through the central axis of one of said cylindrical brushes, said cylindrical brushes being rotatably mounted upon said rod means;
   (e) a camshaft means rotatably mounted longitudinally with respect to said housing means and including a plurality of cam lobes thereon with one of said cam lobes being positioned immediately adjacent to the end of each of said rod means for reciprocally driving said rod means and each cylindrical brush associated therewith laterally with respect to said housing and said conveying means;
   (f) a plurality of flat brush means extending laterally across said conveying means parallel with respect to the axes of said cylindrical brushes with at least one of said flat brush means positioned between each two adjacent cylindrical brush means, said flat brush means including a lower edge thereof in position immediately above said conveying means to contact eggs traveling upon said conveying means therebelow for further washing thereof between each of said cylindrical brush means;
   (g) a control rod extending longitudinally along said conveying means adjacent to said housing means and being secured with respect to each of said flat brush means, said control rod being reciprocally longitudinally movable with respect to said housing means to cause longitudinal movement of said flat brush means with respect to the eggs traveling upon said conveying means to achieve flat brush scrubbing action between each cylindrical brush washing action; and
   (h) a plurality of fluid conduits extending across said conveying means above said flat brush means, said fluid conduits defining spray outlets therealong to supply cleaning solution being carried within said fluid conduits downwardly therebelow.

2. The apparatus as defined in claim 1 further including a plurality of spray nozzles positioned within said spray outlets of said fluid conduits to accurately control the release of cleaning solution downwardly therefrom.

3. The apparatus as defined in claim 1 wherein three of said flat brushes are positioned between each adjacent pair of cylindrical brushes.

4. The apparatus as defined in claim 1 wherein two of said fluid conduits are positioned above said flat brushes between each adjacent pair of cylindrical brushes.

5. The apparatus as defined in claim 1 wherein eight of said cylindrical brushes are utilized.

6. The apparatus as defined in claim 1 wherein said lower edges of said flat brush means include arcuate sections therein for efficiently cleaning the rounded outer surfaces of eggs carried upon said conveyor means.

7. The apparatus as defined in claim 6 for particular use with conveyors carrying eggs oriented in rows thereon wherein one arcuate section of each of said brush means is oriented longitudinally with respect to each row of eggs.

8. The apparatus as defined in claim 7 wherein eggs are oriented in six rows upon said conveying means and wherein said flat brush means defines six complementary rows of said arcuate sections thereof.

9. The apparatus as defined in claim 1 wherein said spray outlets release cleaning solution in a sufficiently wide spray pattern to wet said flat brush means located therebelow as well as said cylindrical brushes being thereadjacent.

10. The apparatus as defined in claim 1 further including pump means in fluid flow communication with respect to said fluid conduits to supply cleaning solution thereto.

11. The apparatus as defined in claim 10 wherein the cleaning solution is supplied at approximately 850 gallons per minute at a pressure of 20 pounds per square inch.

12. An apparatus for cleaning eggs oriented in longitudinally extending rows which comprises:
   (a) a housing means;
   (b) a conveying means movable longitudinally with respect to said housing means and adapted to transport eggs positioned thereon;
   (c) eight cylindrical brushes extending laterally across said conveying means and positioned immediately thereabove with the lowermost portions thereof in contact with eggs being carried upon said conveying means, said cylindrical brushes being movably mounted to allow lateral movement thereof across said conveying means as well as rotational movement thereof about the cylindrical axes thereof;
   (d) a plurality of rod means each extending through the central axis of one of said cylindrical brushes, said cylindrical brushes being rotatably mounted upon said rod means;
   (e) a camshaft means rotatably mounted longitudinally with respect to said housing means and including a plurality of cam lobes thereon with one of said cam lobes being positioned immediately adjacent to the end of each of said rod means for reciprocally driving said rod means and each cylindrical brush associated therewith laterally with respect to said housing and said conveying means;
   (f) a plurality of flat brush means extending laterally across said conveying means parallel with respect to the axes of said cylindrical brushes with three of said flat brush means positioned between each two adjacent cylindrical brush means, said flat brush means including a lower edge defining an arcuate section immediately above each row of eggs thereof in position immediately above said conveying means to contact eggs traveling upon said conveying means therebelow for further washing thereof between each pair of said cylindrical brush means;

(g) a control rod extending lontitudinally along said conveying means adjacent to said housing means and being secured with respect to each of said flat brush means, said control rod being reciprocally longitudinally movable with respect to said housing means to cause longitudinal movement of said flat brush means with respect to the eggs traveling upon said conveying means to achieve flat brush scrubbing action between each cylindrical brush washing action;

(h) a plurality of fluid conduits extending laterally across said conveying means with two of said fluid conduits being positioned immediately above the grouping of three of said flat brush means located between each adjacent pair of said cylindrical brushes, said fluid conduits defining spray outlets therealong to supply cleaning solution being carried within said fluid conduits downwardly onto said flat brush means located therebelow;

(i) a plurality of spray nozzles positioned within said spray outlets of said fluid conduits to accurately control the release of cleaning solution downwardly; and (j) a pump means in fluid flow communication with respect to said fluid conduits to supply cleaning solution thereto.

13. The apparatus as defined in claim 12 wherein said spray outlets release cleaning solution in a sufficiently wide spray pattern to wet said flat brush means located therebelow as well as said cylindrical brushes being thereadjacent.

14. The apparatus as defined in claim 12 wherein the cleaning solution is supplied at approximately 850 gallons per minute at a pressure of 20 pounds per square inch.

* * * * *